OVERLOAD PROTECTION CIRCUITS

Filed July 1, 1955

INVENTOR.
CHARLES B. OAKLEY
BY
ATTORNEY

United States Patent Office 2,832,824

Patented Apr. 29, 1958

2,832,824

OVERLOAD PROTECTION CIRCUITS

Charles B. Oakley, Hamilton Square, N. J., assignor to Radio Corporation of America, a corporation of Delaware Application July 1, 1955, Serial No. 519,519

5 Claims. (Cl. 178—7.5)

Figure 1:
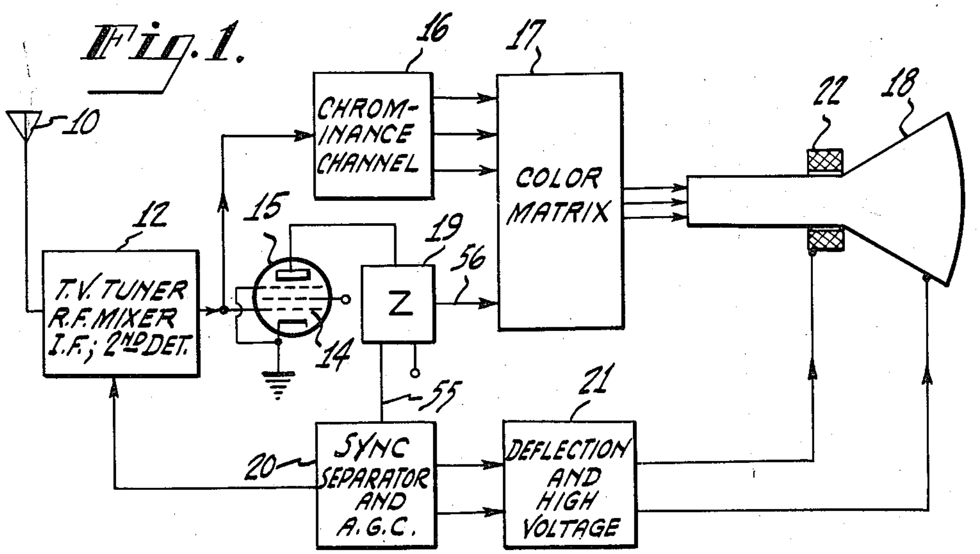

The present invention relates generally to overload protection circuits and particularly to circuits for preventing overload of the high voltage supply or kinescope in a color television signal receiving system.

In television receivers in which the video or luminance signal handling circuits between the second detector and the image reproducing device are direct coupled, the direct current component of the detected luminance signal is applied to the video signal amplifier control grid circuit along with the luminance signal variation components. The direct current component determines the average voltage in the anode circuit of the luminance signal amplifier and is a direct function of the average brightness in the scene being televised.

This is an ideal operating condition except that on scenes of high average brightness, the kinescope ultor current may exceed the permissible maximum, or the high voltage power source may be overloaded resulting in image deterioration through misconvergence and defocusing. Reducing the settings of the contrast and/or brightness controls to avoid overload on high average brightness scenes results in the reproduction of scenes of normal or low average brightness at a highlight and brightness level greatly below that desirable and below the average capability of the kinescope and high voltage power supply.

One method of avoiding this difficulty is the use of direct current degenerative networks which may be adapted to maintain variations in average ultor current below the point of overload for an all white scene. This tends to avoid excessive ultor current on high-average-luminance signals without effecting the high-light to low-light brightness ratio, but has the disadvantage that the background brightness is increased on low-average-luminance signals. Moreover, such an increase may generally be accompanied by a shift in background color tone.

An object of the present invention is to provide an improved circuit for preventing overload of image reproducing devices and associated power sources.

It is a further object of the present invention to provide an improved circuit arrangement for preventing sustained overload of either an image reproducing device or the associated power supply without sacrificing brightness on scenes having high peak but low average brightness.

It is another object of the present invention to provide a kinescope and power supply protection circuit for preventing overload thereof without loss of the direct current component.

In accordance with the present invention, sustained overloading of the voltage source or excessive current in the image reproducing device is substantially prevented by reducing the direct current coupling between the luminance amplifier and the image reproducing device and by reducing the gain of the receiving system during high average brightness scenes. This reduction in gain may be effected under the dynamic control of signal information in the luminance amplifier load circuit indicating a deviation from a predetermined circuit condition.

Figure 2:
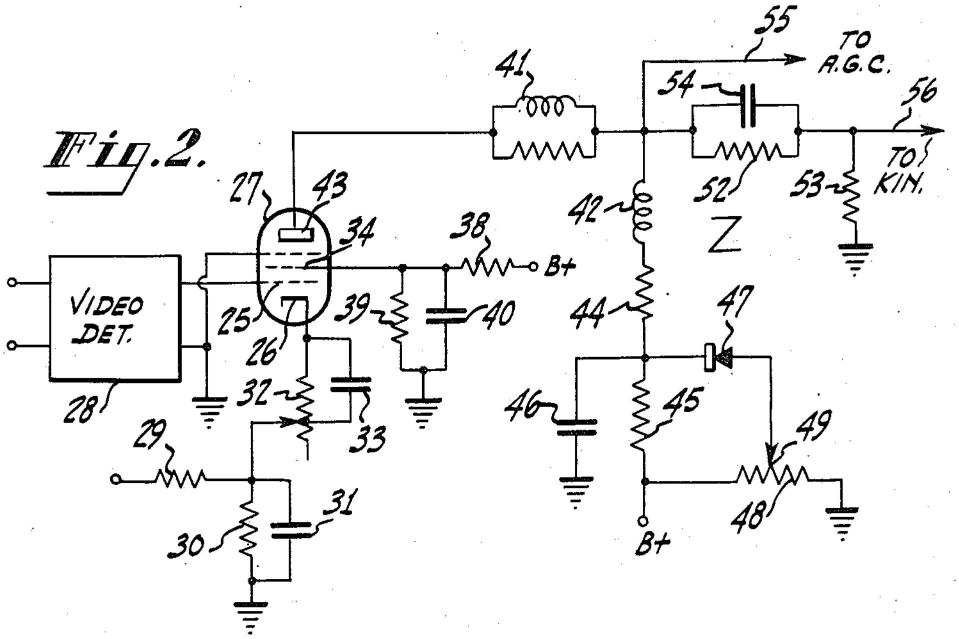

Other objects and advantages of the present invention will become apparent from a reading of the following specification and an inspection of the accompanying drawing in which:

Figure 1 illustrates, by way of a block diagram, a color television signal receiving system embodying the present invention; and Figure 2 is a schematic circuit diagram of an overload protection circuit provided in accordance with the present invention.

Referring to the drawing, and particularly to Figure 1, there is shown a color television receiver of well-known form such, for example, as that described in "Practical Color Television for the Service Industry," published by RCA Service Company, Inc., Camden, New Jersey, second edition, April 1954. While the specific form of signal processing apparatus involved does not constitute a part of the invention, it may be noted that the receiver may be adapted to operate upon signals made up in accordance with standards set by the Federal Communications Commission on December 17, 1953.

In accordance with those standards, information regarding the luminance of a television scene is transmitted by a luminance signal which is an amplitude-modulation of a main carrier wave with video signals proportional to the elemental brightness values of the scene. The electrical information necessary for the reproduction of the several component colors or chrominance in the scene is transmitted by a phase and amplitude-modulated subcarrier wave when considered in combination with the luminance signal.

The chrominance subcarrier wave is conventionally modulated with so-called color difference signals rather than the video signals representative directly of the composite color. The instantaneous phase of the chrominance subcarrier wave with respect to a color reference phase is indicative of a selected hue and the instantaneous amplitude of the wave is proportional to the degree of saturation of the hue.

The antenna 10 in the apparatus of Figure 1 is adapted to intercept the television signal and to apply it to the input terminals of a television tuner section 12 which may be understood as including the usual radio-frequency, mixer, intermediate-frequency and second detector stages. The detected signal information is applied simultaneously to the control electrode 14 of an electron discharge device 15 utilized as a luminance signal amplifier and to a chrominance channel 16.

It is, of course, to be understood that this is a simplified showing of the interaction of the various portions of a color television receiving system. Color difference signals are derived from the chrominance subcarrier wave and are applied along with the amplified luminance signal to a color matrix 17. The color matrix 17 is adapted to combine the signal information received from the chrominance channel and from the luminance channel in such a manner as to provide color signals which may be applied to an image reproducing device or kinescope 18. The kinescope 18 may be of the type described in the article entitled "Three-gun video mask color kinescope," by H. B. Law, which appeared in the October 1951 issue of Proceedings of the I. R. E.

The luminance signal obtained from the luminance signal amplifier 15 is derived from a load circuit illustrated as the rectangle 19. Signals which may or may not be of the same polarity as that applied to the color matrix 17 is also derived from the luminance signal amplifier load circuit 19 and applied to a sync separator and AGC portion 20 of the receiving system in order to derive therefrom the synchronizing signals which are utilized to synchronize a deflection apparatus 21 of the receiving system with that of the transmitter system. The deflection and high voltage portion 21 accordingly is connected to the deflection yokes 22 in order to provide a rectangular scanning raster on the face of the kinescope 18. And, the high voltage developed is applied to the kinescope 18 in order to provide electron beam acceleration.

The AGC system utilized in any particular color television signal receiving system may be of the keyed variety. In this case, a flyback pulse is applied from the deflection and high voltage portion 21 to the sync separator and AGC portion 20 in order to establish, in cooperation with the signal information received from the luminance signal amplifier 15, an AGC voltage which is representative of the D.-C. level of the received signal. The AGC voltage thus developed is applied to one or more of the signal translating portions of the receiving system in order to control the gain of these stages as an inverse function of the amplitude of the received signal.

Those portions of the television receiving system above discussed, with the exception of the luminance signal amplifier, may be of conventional design and are adapted to receive and translate a color television signal in such a manner as to provide an image of the televised subject on the face of the kinescope 18. It has been found, however, that with conventional receiving systems, a high luminance condition may result in signal information being applied to the kinescope 18 which tends to result in an excessively high current condition on the kinescope.

Prior systems, which have been devised to avoid excessively high current conditions were such as to limit the kinescope operating conditions in such a manner as to prevent the full utilization of its capabilities.

In accordance with one aspect of the present invention, however, a high current condition in the kinescope or an overload of the high voltage supply is prevented by establishing a predetermined signal translating level in one of the signal translating stages of the receiving system, such as the luminance signal amplifier stage, as a threshold beyond which the circuit operation is dynamically affected to reduce the possible application of signal information to the kinescope which contains a D.-C. level of such a magnitude which would cause excessive currents.

The schematic circuit diagram shown in Figure 2 illustrates one form of a luminance or video signal amplifier provided in accordance with the present invention. The signal which is applied between the control grid 25 of the cathode 26 of an electron discharge device 27 utilized as the video signal amplifier may be derived from a video detector 28. A contrast control voltage is provided from a network comprising a pair of resistors 29 and 30 which are connected in series between the negative terminal of a source of direct current potential of relatively low magnitude and a point of fixed reference potential or signal ground. The resistor 30 may be by-passed by a capacitor 31 in order to avoid excessive alternating current degeneration. The actual control is accomplished by means of a variable slider or tap on a cathode resistor 32 which may also be partially by-passed by a capacitor 33.

Energizing voltage for the screen grid 34 is obtained from any convenient source such as the low voltage B+ supply of the associated receiving system through a voltage divider arrangement comprising a pair of resistors 38 and 39 which are connected in series between the positive terminal of the low voltage supply and signal ground, with the screen grid 34 connected to the junction of the two resistors. A low impedance path to ground from the screen grid 34 is provided by a capacitor 40.

The anode load circuit for the video amplifier tube 27 comprises the conventional peaking coils 41 and 42 which are connected in series arrangement between the anode

43 and one end of a load resistor 44. In accordance with the present invention, a second load resistor 45 is connected between the conventional load resistor 44 and the positive terminal of a source of direct current energizing voltage such as the low voltage B+ supply of the associated receiving system. A low impedance path to ground is provided for the alternating current components of the video signal by a capacitor 46 which is connected between the junction of the two load resistors 44 and 45 and signal ground.

A unilaterally conducting device 47 is connected in shunt with the resistor 45 and poled in such a direction that the signal voltage developed across the resistor 45 due to the anode current flow therethrough is of such a polarity as to bias the device in a forward direction. A static bias in a reverse direction is applied across the unilaterally conducting device or diode 47 by means of a potentiometer 48 connected between the positive terminal of the low voltage supply and signal ground. An adjustable slider 49 on the potentiometer 48 is connected to the cathode of the diode 47.

With this arrangement, the static reverse bias applied to the diode 47 may be adjusted to any desired magnitude in order to overcome the forward bias developed by the normal anode current flow through the load resistor 45. Accordingly, it may be seen that at such time that the voltage developed across the load resistor 45 exceeds that developed across the portion of the potentiometer 48 contained between the positive terminal of the supply voltage and the slider 49, the diode 47 will be biased in a forward direction thereby providing a shunt circuit of low impedance across the load resistor 45.

Upon the application of video signal information from the video detector 28 an amplified replica thereof containing both an alternating component and a direct current component is available at the junction of the peaking coils 41 and 42. Accordingly, signal information may be derived from this point in the circuit and applied as indicated to the automatic gain control circuit of the system in order to control the overall gain of the system as an inverse function of the signal level. Signal information may also be applied to the appropriate electrode of an image reproducing device or color kinescope or to a color matrix depending on the particular system utilized.

In the present arrangement, a pair of resistors 52 and 53 are connected between signal ground and the junction of the peaking coils 41 and 42 in order to derive the signal information to be ultimately applied to the kinescope. The resistor 52 is by-passed by a shunt connected capacitor 54 in order to provide a low impedance path for the low frequency variational components of the video signal.

In accordance with the present invention, the load resistors 44 and 45 are proportioned such that under normal signal level conditions the direct current level available at the junction of the peaking coils 41 and 42 is more negative than it would be in a conventional video signal amplifier circuit. The function of the resistors 52 and 53 is to reduce this direct current level to its proper proportion relative to the alternating current signal level under normal signal conditions.

If the signal level in the video signal amplifier increases to a point which would tend to provide an excessive current condition in the color kinescope, the anode current flowing through the load resistor 45 is such as to provide the above discussed forward bias across the diode 47 thus short circuiting the resistor 45 and providing a reduced direct current load for the video amplifier. This reduction in the direct current load for the video signal amplifier results in a more positive direct current signal being available at the junction of the peaking coils 41 and 42. The more positive signal available at this point provides an automatic gain control action which reduces the overall gain of the associated signal translating system thereby tending to avoid the application of signals to the kinescope which might produce an overload condition.

At the same time, the voltage divider action provided by the resistors 52 and 53 reduces the direct current component of the video signal to a magnitude below normal in relation to the alternating current component of the video signal and the picture has the characteristics of a typical semi-direct current coupled system.

Upon the termination of the excessive signal condition, the current of the load resistor 45 is reduced to such a point as to restore the reverse bias across the diode 47, thereby, once again providing a proper proportion of direct current and alternating current components in the video signal applied to the kinescope.

The overload protection circuit provided in accordance with the present invention, therefore prevents the application of signals having an excessive level to an image reproducing device in a color television receiving system. The proportion of direct current to alternating current component is affected under the dynamic control of the signal level in one of the signal translating stages of the receiving system such as the video signal amplifier stage. This is accomplished by adjusting the particular signal translating stage so that the circuit operation beyond a predetermined threshold is dynamically affected to reduce the direct current component of the video signal relative to the alternating current component thereof and to effect the automatic gain control portion of the receiving system in such a manner as to reduce the overall gain of the system.

Having thus described the present invention, what is claimed is:

1. A color television receiving system comprising in combination, signal translating means for processing a received signal, a video signal amplifier device coupled with said signal processing means and including an output electrode, a load circuit including a pair of resistors connected in series ararangement with said output electrode for providing a predetermined direct current load, a diode connected in shunt with one of said pair of resistors, means for statically biasing said diode in a reverse direction, a bypass capacitor connected between a point of fixed reference potential and the junction of said pair of resistors, a second pair of resistors connected in series arrangement with said output electrode, a capacitor connected in shunt with one of said second pair of resistors, and automatic gain control means connected between said video signal amplifier stage and said signal translating means for controlling the gain of said system as an inverse function of the amplitude of said received signal.

2. In a color television signal receiving system, the combination comprising, an image reproducing device, signal translating means for processing a received signal, a video signal amplifier direct coupled with said signal translating means and including a load circuit for deriving an amplified video signal, said load circuit including a direct current conductive impedance element, a unilaterally conductive device connected in shunt with said element and means for statically biasing said device in a reverse direction, whereby in response to a predetermined signal level said element is short circuited to establish a reduced direct current load for said amplified video signal, voltage divider means connected between said load circuit and said image reproducing device for reducing the direct current to alternating current proportion of said video signal applied to said image reproducing device, and automatic gain control means connected between said video signal amplifier and said signal translating means for controlling the gain of said system as a function of the amplitude of said received signal.

3. Means providing automatic signal level control in a television receiver, comprising: demodulating means for producing a video signal having a brightness information component; video signal amplifying means having an input and an output; means coupling said demodulating means to said signal amplifying means input for applying said video signal thereto; load impedance means coupled to the output of said amplifying means thereby to provide an output-current path through said amplifying means, said load impedance means having a tap intermediate its ends; a unidirectional conduction device; means coupling said unidirectional conduction device in shunt relation with the portion of the load impedance means between said tap and one of said ends with such polarity as to cause current to flow through said device in the presence of a potential drop across said portion of the load impedance means due to output current flowing therethrough, said unidirectional conduction device coupling means including biasing means to permit conduction of said device only when said potential drop exceeds a predetermined maximum value, thereby to dynamically reduce the value of said load impedance means during intervals in which the brightness information component of said video signal causes the output current of said amplifying means to exceed a predetermined maximum.

4. Automatic signal level control apparatus for preventing overload during periods of high average brightness level in television receivers comprising: means for developing a composite video signal having a brightness information component and a synchronizing signal component; video signal amplifying means including an electron discharge device having grid, cathode and anode elements; means coupling said demodulating means between said grid and cathode elements for applying said video signal to said amplifying means to produce an amplified composite video signal; load impedance means; means including a source of direct current potential coupling said load impedance means between said cathode and anode elements thereby to provide an anode-current path through said amplifying means, said load impedance means having a tape intermediate its ends; a unidirectional conduction device; means coupling said device in shunt relation with the portion of the load impedance means between said tap and one of said ends with such polarity as to cause current to flow through said device in the presence of a potential drop across said portion of the load impedance means due to anode current flowing therethrough, said unidirectional conduction device coupling means including biasing means to permit conduction of said device only when said potential drop exceeds a predetermined maximum value, thereby to dynamically reduce the value of said load impedance means during said periods of high average brightness level which causes the anode current of said amplifying means to exceed a predetermined maximum, whereby the average brightness level of said amplified composite video signal is reduced during said intervals.

5. The subject matter as recited in claim 4 and having AGC potential developing means coupled to said composite video signal developing means for controlling the magnitude of said video signal in response to an applied control signal; means coupling said load impedance to said AGC potential developing means for applying said amplified composite video signal thereto, thereby to generate said control signal to control the magnitude of said AGC potential in accordance with the magnitude of said amplified composite video signal.

References Cited in the file of this patent

UNITED STATES PATENTS

| | | |
|---|---|---|
| 2,454,415 | Tourshore | Nov. 23, 1948 |
| 2,627,022 | Anderson | Jan. 27, 1953 |
| 2,699,497 | Amos | Jan. 11, 1955 |